US006743021B2

(12) United States Patent
Prince et al.

(10) Patent No.: US 6,743,021 B2
(45) Date of Patent: Jun. 1, 2004

(54) REFRESHABLE BRAILLE DISPLAY SYSTEM WITH A FLEXIBLE SURFACE

(75) Inventors: Troy S. Prince, Cleveland Heights, OH (US); Gerard G. Skebe, Eastlake, OH (US); Frederick J. Lisy, Euclid, OH (US); Robert N. Schmidt, Cleveland, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

(21) Appl. No.: 10/091,669

(22) Filed: Mar. 5, 2002

(65) Prior Publication Data

US 2002/0106614 A1 Aug. 8, 2002

Related U.S. Application Data

(63) Continuation-in-part of application No. 09/169,480, filed on Oct. 10, 1998, now Pat. No. 6,354,839.

(51) Int. Cl.$^7$ .............................................. G09B 21/00
(52) U.S. Cl. ........................................ 434/113; 434/112
(58) Field of Search ................................. 434/112, 113, 434/114, 115, 116, 117; 340/407.1, 407.2

(56) References Cited

U.S. PATENT DOCUMENTS

| | | | | | |
|---|---|---|---|---|---|
| 3,659,354 | A | * | 5/1972 | Sutherland | 434/113 |
| 4,586,903 | A | * | 5/1986 | Burchart | 434/114 |
| 4,758,165 | A | * | 7/1988 | Tieman et al. | 434/114 |
| 4,793,354 | A | * | 12/1988 | Wright et al. | 600/300 |
| 4,836,784 | A | * | 6/1989 | Joachim | 434/113 |
| 4,985,692 | A | * | 1/1991 | Breider et al. | 340/407.2 |
| 5,086,287 | A | * | 2/1992 | Nutzel | 340/407.1 |
| 5,222,895 | A | * | 6/1993 | Fricke | 434/113 |
| 5,286,199 | A | * | 2/1994 | Kipke | 434/114 |
| 5,366,050 | A | * | 11/1994 | Raynes | 182/18 |
| 5,453,012 | A | * | 9/1995 | Hudecek | 434/114 |
| 5,496,174 | A | * | 3/1996 | Garner | 434/114 |
| 5,580,251 | A | * | 12/1996 | Gilkes et al. | 434/113 |
| 5,685,721 | A | * | 11/1997 | Decker | 434/114 |
| 5,766,013 | A | * | 6/1998 | Vuyk | 434/114 |
| 5,842,867 | A | * | 12/1998 | Hong et al. | 434/114 |
| 5,871,842 | A | * | 2/1999 | Crotzer et al. | 428/334 |

* cited by examiner

Primary Examiner—Kurt Fernstrom
(74) Attorney, Agent, or Firm—Brian Kolkowski; James Hudak

(57) ABSTRACT

The present invention is further directed to a refreshable display system with a flexible surface, with one application being a refreshable Braille display systems for use as a monitor for computer systems.

In one embodiment, the present invention is a refreshable Braille display system or a module from such a system comprising a) a plurality of microelectromechanical valves having a top surface and a bottom surface, each microelectromechanical valves having an opening or positioned in line with an opening, each of which represents a Braille dot and each opening arranged in a pattern of Braille cells with the Braille cells forming a Braille display; and b) an elastomeric polymer having a upper and a lower surface, the lower surface of the elastomeric polymer being sealed about each openings which represent the Braille dots; wherein during operation of the display system the upper surface of the elastomeric polymer forms a plurality of Braille dots which are extended and retracted based upon the operation of each of the electromechanical valves. In other embodiments, the refreshable Braille display system uses microelectromechanical piezoelectric devices or microelectromechanical shape memory alloy actuated devices in place of the microelectromechanical valves.

16 Claims, 12 Drawing Sheets

|       | $t_1$ | $t_2$ | $t_3$ | $t_4$ |
|-------|-------|-------|-------|-------|
|       | 0     | 1     | 1     | 1     |
|       | 1     | 0     | 1     | 1     |
|       | 1     | 1     | 0     | 1     |
|       | 1     | 1     | 1     | 0     |

X  BRAIL DOT EXTENDED

0  OPEN ELECTRODE VOLTAGE

1  CLOSED ELECTRODE VOLTAGE

|       | COL 1 | COL 2 | COL 3 | COL 4 | COL 5 |
|-------|-------|-------|-------|-------|-------|
| ROW 1 | X     |       |       |       | X     |
| ROW 2 |       | X     |       | X     |       |
| ROW 3 |       | X     |       |       | X     |
| ROW 4 | X     |       |       | X     |       |
| $t_1$ | 0     | 1     | 1     | 1     | 0     |
| $t_2$ | 1     | 0     | 1     | 0     | 1     |
| $t_3$ | 1     | 0     | 1     | 1     | 0     |
| $t_4$ | 0     | 1     | 1     | 0     | 1     |

Fig. 5

REFRESHABLE BRAILLE DISPLAY SYSTEM WITH A FLEXIBLE SURFACE

CROSS REFERENCES TO RELATED APPLICATIONS

This application is a continuation in part to application Ser. No. 09/169,480 filed on Oct. 10, 1998 now U.S. Pat. No. 6,354,839.

STATEMENT REGARDING FEDERALLY SPONSORED RESEARCH

This invention was made as a result of work under Grant 1R43/44EY11059 between the National Institutes of Health, National Eye Institute and Orbital Research Inc., Grant RA 94129004 between the U.S. Department of Education and Orbital Research Inc., and Grant DMI-9760377 between the National Science Foundation and Orbital Research Inc. and the U.S. Government has rights in this invention pursuant thereto.

BACKGROUND OF THE INVENTION

1. Field of the Invention

The present invention is directed to a refreshable display system with an flexible surface, with one application being a refreshable Braille display systems for use as a monitor for computer systems.

2. Technology Review

The flourishing computer and information revolution has left behind visually impaired and particularly visually and hearing impaired individuals. This is due to the fact that visual display units, typically cathode ray tubes (CRTs), are the heart of all modern communication and information systems including the Internet. This especially affects those impaired individuals in the technical fields. To remedy this situation and promote the Americans with Disabilities Act that mandates equal access and opportunities be presented to all capable individuals, Congress has proposed a State Model Bill. The bill would provide materials in a computer-accessible format capable of Braille reproduction. It states, "the Legislature finds that:

(1) the advent of the information age throughout the United States and around the world has resulted in lasting changes in information technology;

(2) use of interactive visual display terminals by state and state-assisted organizations is becoming a widespread means of access for employees and the public to obtain information available electronically, but nonvisual access, whether by speech, Braille, or other appropriate means has been overlooked in purchasing and deploying the latest information technology;

(3) presentation of electronic data solely in a visual format is a barrier to access by individuals who are blind or visually impaired, preventing them from participating on equal terms in crucial areas of life, such as education and employment;

(4) alternatives, including both software and hardware adaptations, have been created so that interactive control of computers and use of the information presented is possible by both visual and nonvisual means; and (5) the goals of the state in obtaining and deploying the most advanced forms of information technology properly include universal access so that segments of society with particular needs (including individuals unable to use visual displays) will not be left out of the information age.

Prior art computer interfaced Braille devices use various mechanisms to actuate the Braille dots and "refresh" the text. The dots are controlled via macroscopic actuators comprised of piezoelectric materials, shape memory alloys, and solenoids to raise individual pins in the Braille cells. Most of these devices display one or two lines and up to 80 Braille cells per row. Ideally, more rows of Braille text are desired, however, the complexity of the actuators and the close spacing of the Braille dots limit the number of Braille cells and increase the costs. Such actuators also require a very large "volume overhead" to accommodate this complex network of actuators and wires needed to operate the Braille dots. The result is that the foot print of the unit is much larger than the display surface and it is difficult to skim information based on the limited number of Braille cells.

Recently, a company in Cambridge, Mass. called Braille Displays overcame this limitation of only being able to produce a Braille display with two rows of Braille cells. This company with the support of the National Science Foundation was able to produce a prototype 4 line by 40 column prototype refreshable Braille display. This 160 cell display is not commercially available partially due to the costs and the difficulty of integrating large numbers of actuators in a manufacturing process. Telesensory another company in this area produces an 80 character unit, PowerBraille 80 (PB 80). This device has many user friendly features integrated into its device such as a cursor locator, a touch sensitive strip and scrolling toggle.

U.S. Pat. No. 5,685,721, to Decker, discloses a macro-sized shape-memory alloy based actuator enclosed in a series of tubes and housed in modules which are mounted into a multi-row display under ledges. U.S. Pat. No. 5,685,721, to Vuyk, discloses another macro-sized actuation technique utilizing an intrinsically conducting polymer sheet that expands when a charge is applied. Another macro-sized actuation technique, utilizing a rotary actuator with cams is disclosed by U.S. Pat. No. 5,453,012, to Hudecek. Also, Garner, U.S. Pat. No. 5,496,174 utilizes an electrorheological fluid that expands when a high voltage is applied. All of these devices suffer from one or more of the same fundamental problems: a large number of individual components needed for each Braille dot increasing assembly problems; high power requirements eliminating the potential for portability and creating problems dissipating the excess heat; responding fast enough to allow refresh rates appropriate for computer based communications; the difficulties in assembling the large number of Braille dots needed for true replication of computer display terminals; and the costs of manufacturing such displays.

Another approach to providing access to the visually impaired has been the development of optical recognition systems attached to voice synthesizers. Although these devices represent an enormous leap forward in access to both computerized and printed material, they are not appropriate for all tasks. Specifically, they cannot be used with detailed technical material, which has a very specialized vocabulary. Medicine, law, accounting, engineering, and science careers are restricted by this limitation. Voice synthesizing devices are not effective at dealing with tabular material. The voice synthesizing devices do not provide blind accountants and bookkeepers the access they require to spreadsheets and databases. Furthermore, voice synthesizers are not capable of limited document skimming, or provide a means to address accessing links otherwise known as sub-directories or complementary subject indicators. Perhaps most important, these reading devices provide limited ability to edit text or tables.

The devices currently available for the sight impaired are limited and have drawbacks in that they do not have fast enough refresh rate or sufficient Braille character ability to replicate a computer display, including memory capacity, readable area, and scanning and highlighting functions; are bulky and heavy; can not be adapted for different applications, i.e., a lap top vs. a desk top computer, cannot "display" technical, accounting, spreadsheets, or other specialized forms of display which are not a basic textual document; and are expensive to manufacture.

Accordingly, a need exists for a refreshable Braille display that overcomes the above mentioned limitations and drawbacks.

SUMMARY OF THE INVENTION

The present invention is further directed to a refreshable display system with a flexible surface, with one application being a refreshable Braille display systems for use as a monitor for computer systems.

In one embodiment, the present invention includes a refreshable Braille display system or a module in such a system comprising a) a plurality of microelectromechanical valves having a top surface and a bottom surface, each microelectromechanical valves having an opening or positioned in line with an opening each of which represents a Braille dot and each opening arranged in a pattern of Braille cells with the Braille cells forming a Braille display; and b) an elastomeric polymer having a upper and a lower surface, the lower surface of the elastomeric polymer being sealed about each opening which represent the Braille dots; wherein during operation of the display system the upper surface of the elastomeric polymer forms a plurality of Braille dots which are extended and retracted based upon the operation of the electromechanical valves.

In another embodiment, the present invention includes a refreshable Braille display system or a module in such a system comprising a) a plurality of microelectromechanical piezoelectric based devices having a top surface and a bottom surface, each microelectromechanical piezoelectric based device having an opening or positioned in line with an opening each of which represents a Braille dot and each opening arranged in a pattern of Braille cells with the Braille cells forming a Braille display; and b) an elastomeric polymer having a upper and a lower surface, the lower surface of the elastomeric polymer being sealed about the openings which represent the Braille dots; wherein during operation of the display system the upper surface of the elastomeric polymer forms a plurality of Braille dots which are extended and retracted based upon the operation of the electromechanical piezoelectric based devices.

In another embodiment, the present invention includes a refreshable Braille display system or a module in such a system comprising a) a plurality of microelectromechanical shape memory alloy based devices having a top surface and a bottom surface, each microelectromechanical shape memory alloy based device having an opening or positioned in line with an opening each of which represents a Braille dot and each opening arranged in a pattern of Braille cells with the Braille cells forming a Braille display; and b) an elastomeric polymer having a upper and a lower surface, the lower surface of the elastomeric polymer being sealed about the openings which represent the Braille dots; wherein during operation of the display system the upper surface of the elastomeric polymer forms a plurality of Braille dots which are extended and retracted based upon the operation of the electromechanical shape memory alloy based devices.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

Further features of the present invention will become apparent to those skilled in the art to which the present invention relates from reading the following specification with reference to the accompanying drawings in which:

FIG. 5 is schematic representation of the Braille dots actuation scheme.

DETAILED DESCRIPTION OF THE INVENTION

In one embodiment, the present invention is a refreshable Braille display 2 system or a module from such a system comprising a) a plurality of microelectromechanical valves having a top surface and a bottom surface, each microelectromechanical valve having an opening or positioned in line with an opening, each of which represents a Braille dot and each opening arranged in a pattern of Braille cells with the Braille cells forming a Braille display; and b) an elastomeric polymer having a upper and a lower surface, the lower surface of the elastomeric polymer being sealed about each opening which represent the Braille dots; wherein during operation of the display system the upper surface of the elastomeric polymer forms a plurality of Braille dots which are extended and retracted based upon the operation of each of the electromechanical valves. In other embodiments, the refreshable Braille display system uses microelectromechanical piezoelectric devices or microelectromechanical shape memory alloy actuated devices in place of the microelectromechanical valves to deform the elastomeric polymer.

Figure 1:
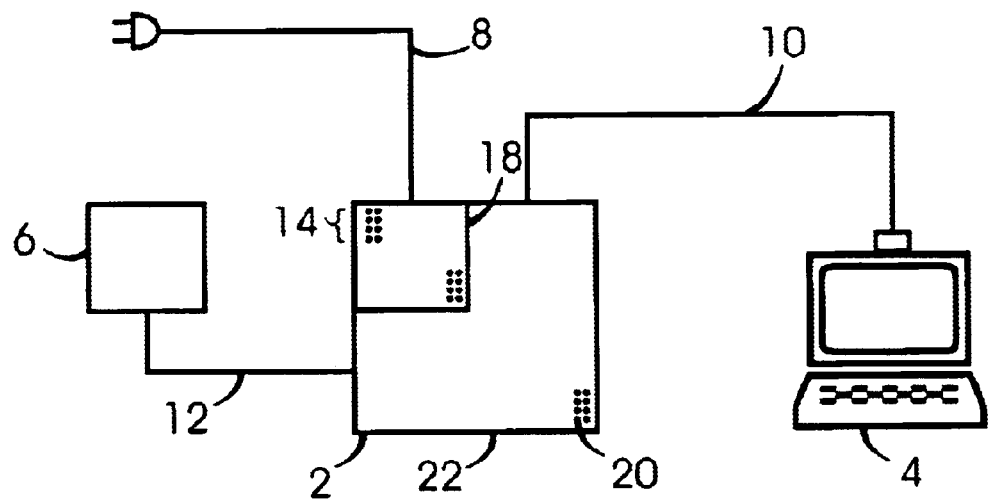
FIG. 1 is a view of the present invention.

An example of the refreshable Braille display 2 system of the present invention is shown in FIG. 1. In FIG. 1, a Braille display 2 comprises Braille dots 20 arranged into Braille cells 14. Although, each Braille cell 14 requires only six Braille dots 20, the Braille cell 14 of the present invention is preferably comprised of eight Braille dots 20. The two extra Braille dots 20, (by convention referred to as Braille dots 7 and 8) are used to highlight text within a document such as hyperlinks, boldface or italicized text. The Braille cells 14 are arranged in modules 18. In this embodiment of the present invention, the Braille cells in each module are arranged in two rows and twelve columns (FIG. 2), although other configurations could be used. For pneumatic actuation, a compressor 6 provides pneumatic pressure to the Braille display 2 through tubing 12 or a combined electrical/pneumatic pathway. Optionally, the system can include a pressure vessel along with the compressor 6 or in place of the compressor 6 for pneumatic actuation. The Braille display 2 receives electrical power through power cable 8 which can plug into a standard 120 or 220 volt receptacle or batteries that may be mounted separately or within the Braille display 2. Alternatively, the Braille display may be powered by any means known to those skilled in the art including through a computer data port. In the present embodiment, a data cable 10 connects a personal computer 4 to the Braille display 2.

Figure 2:
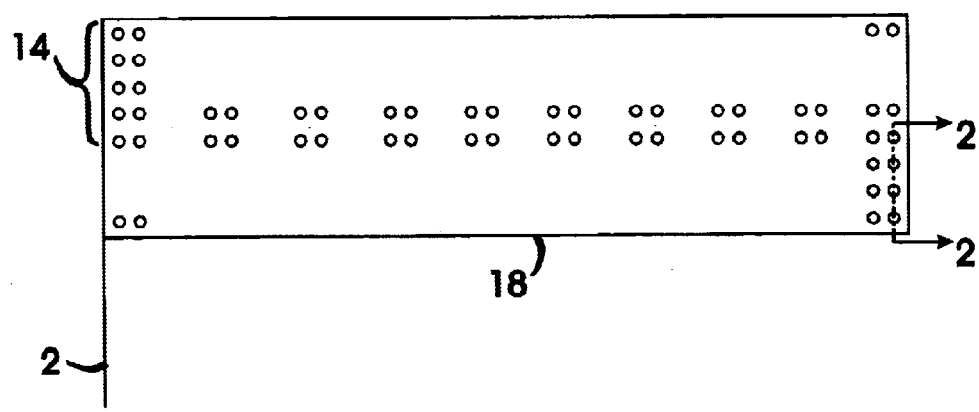
FIG. 2 is a layout of the module showing Braille cells.

Each refreshable Braille display 2 system will be composed preferably of hundreds if not thousands of Braille 20 dots. Preferably, the refreshable Braille display 2 system will be modular in design. This will reduce the costs and provide easy maintenance without sacrificing system robustness. These modules 18 will be able to be stacked both horizontally and vertically for unique versatility in Braille display systems. FIG. 2 is a layout of a module 18 showing Braille cells 14. In FIG. 2 there is shown a layout of a module 18 with the Braille cells 14 arranged in two rows and twelve columns. The present invention is not limited by any particular layout of the modules 18. The module 18, however, is preferably designed to take into account efficiencies in manufacturing both the module 18 and the Braille display 2 as well as Braille display 2 repair and use requirements. Since in this particular embodiment of the present invention, each Braille character comprises eight Braille dots 20, each module 18 will have 2×12×8=192 Braille dots 20. Also, in this particular embodiment (10 rows, 84 cells wide) there are 35 modules 18 on the Braille display 2 arranged in 5 rows and 7 columns for a total number of 6720 Braille dots 20 on the Braille display 2. This modular design allows the production of various sized Braille displays 2 based upon the number of modules 18 used. The modular design allows for longer row (e.g. 10 rows, 84 cells wide) Braille displays to display spreadsheets and other tabular data, or longer and narrower (e.g. 20 rows, 44 cells wide) for reading text, or single module (2 rows, 12 cells wide) Braille displays for use with a portable computer, ATM machines, cell phones, personal digital assistants (PDA's) or other embedded or portable devices.

Figure 3:
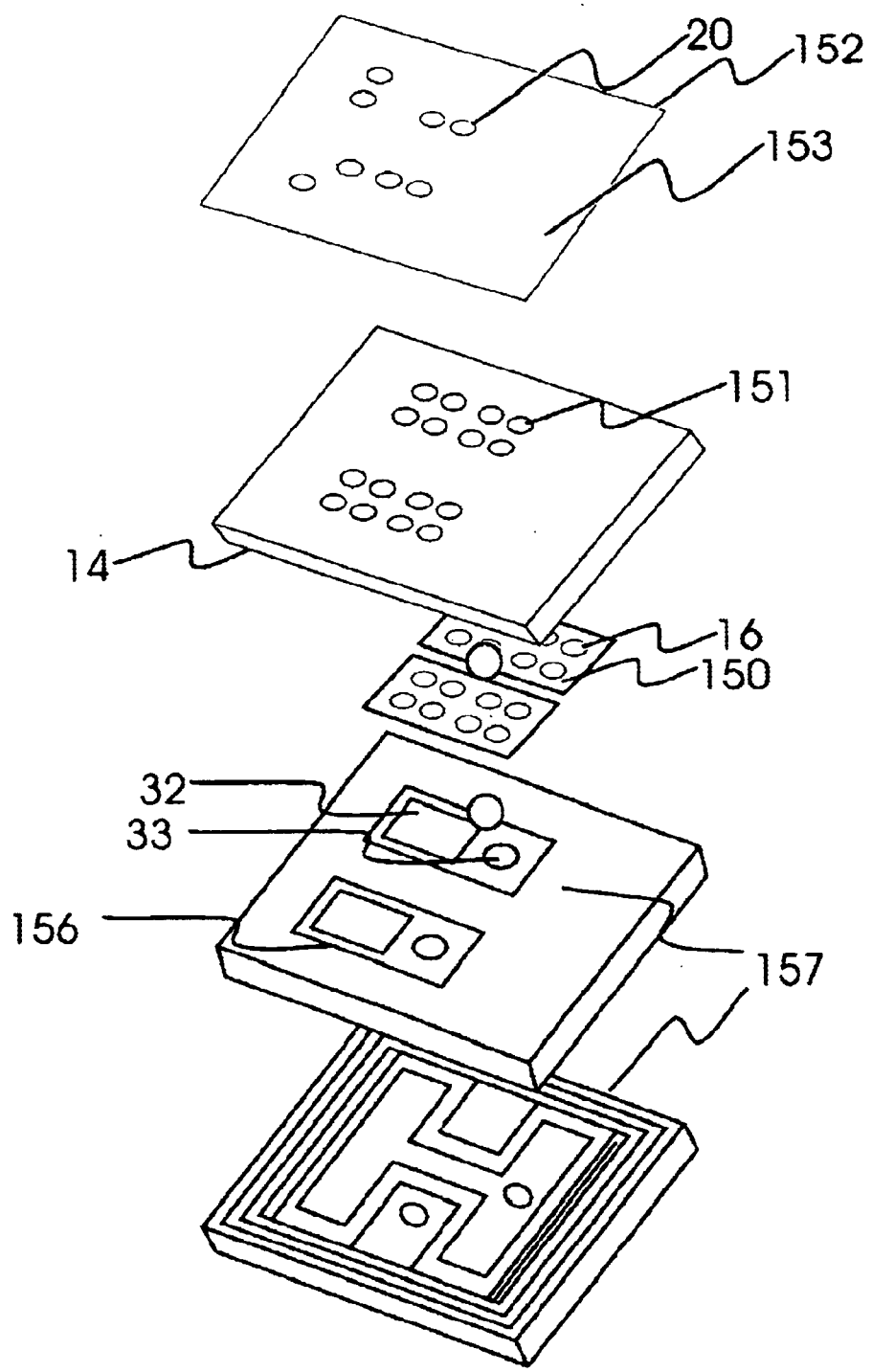
FIG. 3 is an exploded view of a schematic for the module structure.

FIG. 3 is another embodiment of the module 18. This module 18 contains two Braille cells 14 which contain sixteen Braille dots 20 in total. The schematic shows a further example of how the module 18 and possibly the Braille display 2 (see FIG. 1) could be configured. The module 18 which would be part of an overall Braille display 2 has a plurality of microelectromechanical valves or devices (piezoelectric or shape memory alloy) 16. Each of the microelectromechanical valves or devices 16 having a upper 150 and a lower surface (not shown). The microelectromechanical valves or devices 16 have an opening or are positioned in line with an opening 151 each of which represents a Braille dot 20. The Braille dots 20 are arranged in a pattern of Braille cells 14 and ultimately (through the use of a number of modules 18) form a Braille display 2 (see FIG. 1). The module 18 with an elastomeric polymer 152 (in this example in the form of a thin film) having an upper 153 and a lower surface (not shown). The lower surface of the elastomeric polymer 152 being above the top surface 150 of each of the microelectromechanical valves or devices 16. The elastomeric polymer further being sealed (not shown) on the lower surface about each of the openings 151 which represent the Braille dots 20. The seal about each opening can be made for example using either a suitable epoxy, other adhesive, direct welding or a vacuum seal. During operation of the Braille display 2, the upper surface 153 of the elastomeric polymer 152 forms a plurality of Braille dots 20, which are extended and retracted based on the operation of the microelectromechanical valves or devices 16.

The Braille dot 20 of the present invention is formed by the deformation of a flexible, compliant and resilient polymer. The flexible, compliant surface 153 may be constructed of a single sheet of polymer material stretched over the top of the housing (not shown) for the Braille display 2 containing a determined compliment of modules 18. Optionally, the flexible, compliant surface 153 may be stretched over the top of the module 18. Further, the lower surface of the flexible, compliant surface 153 may be molded to form a surface, which is integrated into the module to reduce the stress on the seal about the opening. The top surface of the Braille display 2 or the module 18 presents a continuous surface which provides both environmental protection to the microelectromechanical valves or devices 16 and other electronic hardware as well as a tactile surface with no discrete holes, seams, gaps or voids. This modular design allows different size Braille displays 2 to be assembled from a different number of individual modules 18. Preferably the surface is a flexible, compliant polymer, and more preferably is an elastomeric polymer. More preferably the surface is an elastomeric polymer film or a thin molded surface. The elastomer used in the various embodiments of the present invention can either be thermoplastic or thermosetting. Elastomers are those materials with the ability to be stretched to at least almost twice their original length, to retract very rapidly and to approximate their original length when released. Examples of thermoplastic elastomers include but are not limited to thermoplastic polyolefin rubbers including thermoplastic polyurethanes. Examples of thermoset elastomers include but are not limited to styrene-butadiene copolymer, polychloroprene (neoprene), nitrile rubber, butyl rubber, polysulfide rubber, cis-1,4polyisoprene, ethylene-propylene terpolymers (EPDM rubber), silicone rubber, and polyurethane rubber. In the present invention, preferably, one of two commercially available elastomer films can be used; a medium modulus latex polymer mix, or a blend of Natural Rubber, Neoprene and Nitrile. In the present invention preferably a low modulus elastomer with a thickness of from about 0.001 to about 1.25 mm is used for the top surface of the Braille display 2, more preferably the thickness is from about 0.010 to about 0.06, and most preferably about 0.025 mm. Preferably, the modulus of elasticity of the flexible, compliant surface is less than about 500,000 psi, more preferably the modulus of elasticity is less than about 300,000 psi and most preferably the modulus of elasticity is less than about 200,000 psi. Preferably, the surface is flexible, resilient and compliant over an application temperature range from about −30° C. to about 70° C. This provides a continuous uninterrupted tactile reading surface for the user eliminating any interference with reading of Braille cells 14 for a variety of applications.

Optionally, the module 18 has a plenum or high pressure pathway 32 and a vent path or lower pressure pathway 33. The plenum 32 and vent path 33 both forming part of the module's 18 pneumatic or hydraulic pathway structure. The pathway structure being the structure for carrying the gas or fluid to or away from the microelectromechanical valve 16. The plenum 32 and vent path 33 being enclosed in this embodiment by sealing channels 156 which help to contain the gas or fluids which pass there through. The sealing channels 156 in this embodiment being at least in part also part of the electric pathway 157 which provides the electric power to actuate a microelectromechanical valve 16. By incorporating both electronic and pneumatic and/or hydraulic components together, this reduces processing and/or manufacturing costs and further significantly reduces the size of the modules 18.

Figure 4:
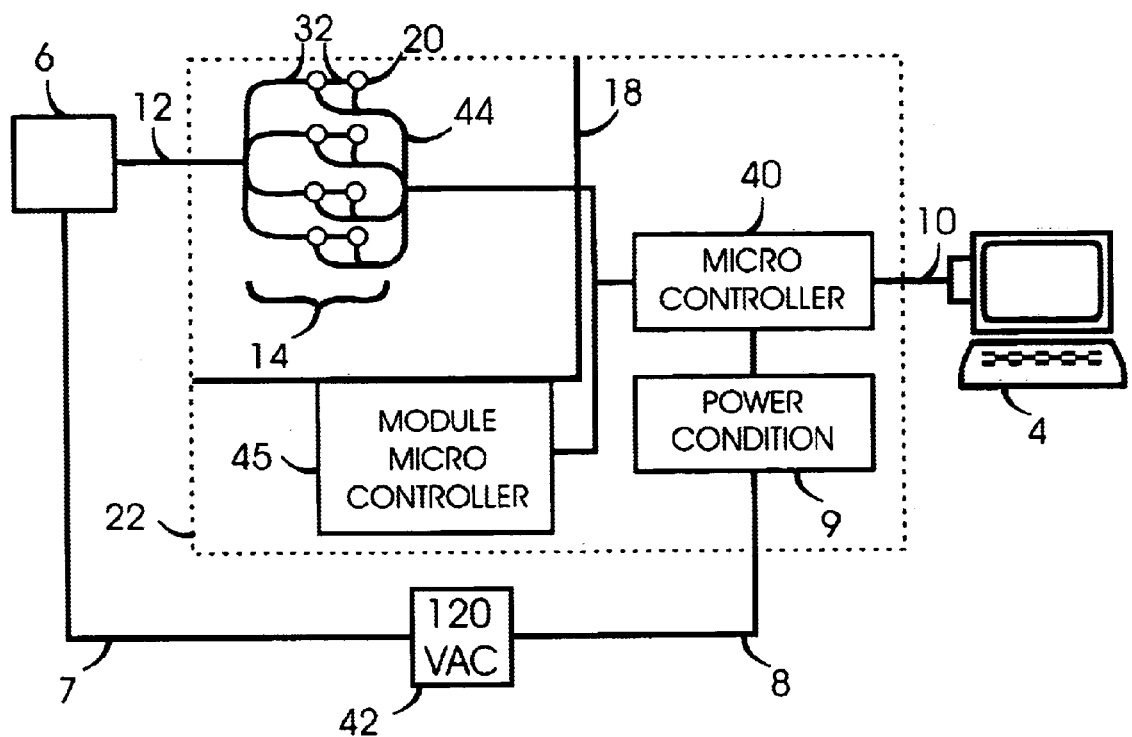
FIG. 4 is a block diagram of the control function of a single module of the present invention.

Due to the nature of the Braille dot array, row and column, or matrix addressing, of individual Braille dots is considered by far to be the simplest, most cost effective method to drive the refreshable Braille display. It is envisioned that one embodiment of the present invention will utilize those row and column addressing or multiplexing techniques known to those skilled in the art and built into other electronic products to assign each Braille cell a unique address. In this embodiment, the row and column architecture is multiplexed in a manner similar to computer Liquid Crystal Displays (LCD's). The rows and the columns will be scanned electronically to deploy desired Braille dots and to keep the desired dot deployed. The rapid scanning frequency required for the row and column addressing technique will leverage one of the outstanding mechanical properties of the microelectromechanical valves by taking advantage of rapid response times. In another embodiment, standard row and column drive integrated circuits (IC) are used. These drivers were created for the Liquid Crystal Display (LCD) and Electroluminescent Display (ED) industries and are available in several versions. These devices are be adapted to the refreshable Braille display system in the most cost-effective way. These ICs have versions with various numbers of row and columns drivers in multiples of eight. Each 8-dot Braille character have four rows of dots for each row of characters and two columns of dot per each character column, the actually row and column driving lines required are four time the number of character rows and two times the character columns. Since these row and column drivers are digital circuits and as such, binary based, the number of driving lines available is in multiples of 4 or 8. Therefore, a 32 line column driver and a 32 line row driver would most efficiently drive an 8 row by 16 column character array. Use of standard sized display modules 18 will also reduce the total costs of Braille display 2 systems due to the economies of scale and the ability to replace defective modules 18 quickly and easily. The use of the modules 18 will also make it easy for one skilled in the art to scale multiple modules 18 together to form larger systems for a variety of applications. FIGS. 4 and 5 are diagrams showing the control function for the modules and the electronic addressing scheme for the Braille dots 20.

FIG. 4 is a block diagram of the control function of a single module 18 of an embodiment of the present invention. In FIG. 4, data cable 10 connects between a personal computer 4 and the microcontroller 40 mounted in the housing 22. Braille translation software is programmed into the personal computer 4 to translate display information into commands for the Braille display system. Both commercially available Braille Translation software, such as Duxbury or MicroDots, or custom programmed software may be used with the Braille device. The data cable 10 transfers data and information, translated and otherwise conditioned by the software, from the computer to the microcontroller 40. The microcontroller 40 contains firmware and memory capacity, including nonvolatile memory, which is programmed to actuate the appropriate Braille dots 20 in response to the data and information from the personal computer 4. The Braille display system can take a number of different configurations, one configuration utilizes a single microcontroller 40 which control the Braille dots by sending appropriate signals through leads 44 (also shown in FIG. 3), a second configuration that utilizes a microcontroller 40 to coordinate the operation of individual module microcontrollers 45 which then control the Braille dots in the respective module by sending appropriate signals through leads 44, and a third configuration is where the individual dots are controlled through a personal computer or some other computing device separate from the display through a data cable. Each individual module 18 has individual connectors and wiring to connect each module 18 with either the neighboring modules 18 or the microcontroller 40 for signal, power, and, depending on actuation technique, a pneumatic supply line 12. The modules 18 are mechanically attached to a housing 22 that will hold each individual module 18 and the supporting hardware: power conditioning 9; potentially a compressor 6; and, a coordinating microcontroller 40 which will control the individual modules 18 and communicate with the computer 4. The use of module microcontrollers simplifies the overall control system, reduces the total computational power needed in a single processor, and allows the Braille dots to be operated at a rapid refresh rate. The refresh rate is the amount of time it takes for a Braille dot 20 to extend and retract. A high refresh rate is important for many computer based applications where rapid scrolling and moving through information is needed, such as a spreadsheet or other tabular data. For the pneumatically actuated Braille display systems, compressor 6 provides pneumatic pressure to each Braille dot 20 through tubing 12 and which provides pneumatic pressure to the plenums 32. The compressor 6 can be any appropriate air pump but in the present invention a Medo linear compressor, ACO 102, is used. In designs where the MEMS device 16 directly actuates the Braille dot 20, no pneumatic force is needed and therefore, neither is a compressor 6. Power is provided from a power source 42, to the compressor 6 and the microcontroller 40 by power cables 7 and 8, respectively. The power can be conditioned by power conditioning means 9 before connection to the microcontroller 40. In another embodiment, the compressor 6 can be located inside of the housing 22 and one power cable can be used for both the compressor 6 and the microcontroller 40 with power provided from either the power conditioning means 9 or directly from 120 VAC 42. The power conditioning means 9 can convert and condition either AC or DC power coming from batteries, standard wall receptacles, or other electrical power source. In still another embodiment, a pressure vessel (not shown) can be used to provide the pneumatic pressure and to reduce power consumption.

FIG. 5 is a schematic representation of an example of an electronic addressing scheme for the Braille dots 20. In FIG. 5, the Braille dots 20 are actuated based upon a row and column scanning mechanism. Although, only 4 rows and 5 columns are shown in FIG. 5, the scanning mechanism can be applied to any number of rows and columns. If at any time "t" both the row and column are at open electrode voltage (signified by "0") the microelectromechanical valve or device (piezoelectric or shape memory alloy) is open and the Braille dot 20 is extended. If either the row or the column is at close electrode voltage (signified by "1"), the microelectromechanical device 16 is closed and the Braille dot 20 is retracted. In this manner, at any time "t" a specific Braille dot 20 based upon its row and column location can be operated. For example, at t1, row 1 has open electrode voltage and column 1 has open electrode voltage. The Braille dot 20 is extended as shown by the X on the actuation scheme.

The microelectromechanical valves and devices (piezoelectric or shape memory alloy) of the present invention are preferably very small (sub-millimeter) in size, low cost and have low power requirements. Preferably, the microelectromechanical valves and devices (piezoelectric or shape memory alloy) are processed using micromachining technologies know to those skilled in the art. Further preferably, the microelectromechanical valves and devices (piezoelectric or shape memory alloy) are designed to be integrated with the electronic assembly requirements of the module 18 or for other uses as may be envisioned by those skilled in the art.

Figure 6:
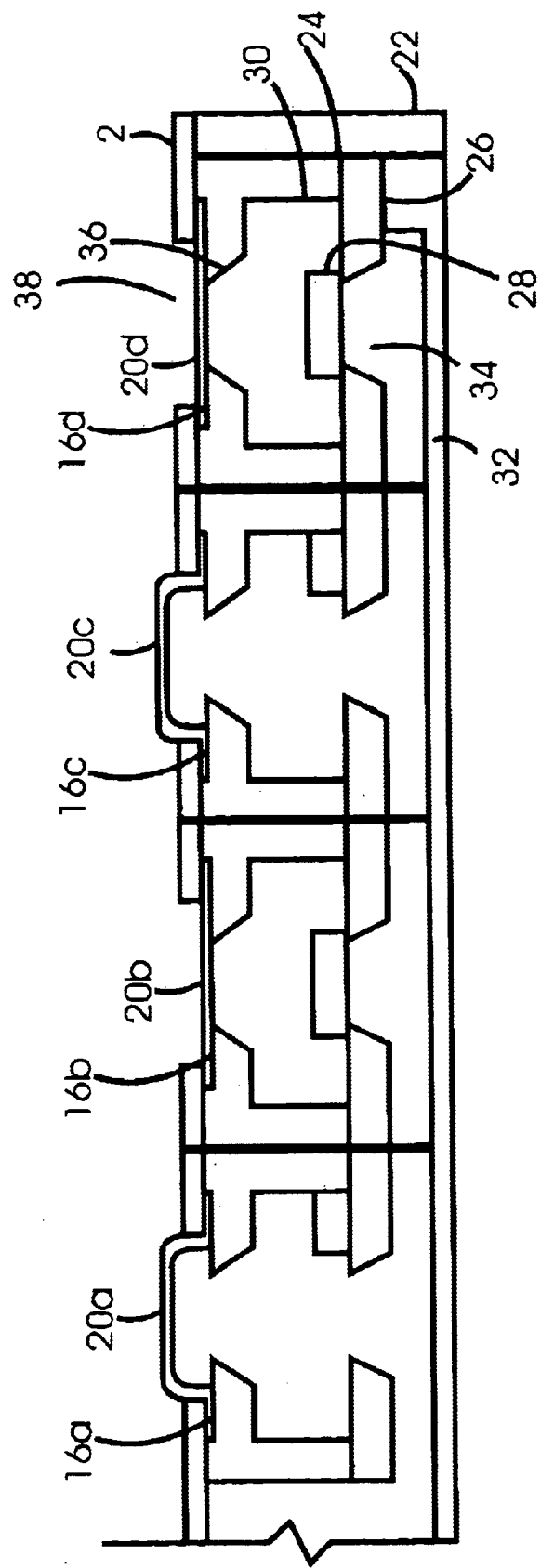
FIG. 6 is a view of the section cut along lines 2—2 on FIG. 2

By way of example but not limitation some of types of microelectromechanical valves and devices (piezoelectric or shape memory alloy) which can be utilized in a number of embodiments of the present invention are shown in FIGS. 6 through 10. FIGS. 6–8 show examples of different types of microelectromechanical valves.

FIG. 6 is a cross section of the module 18 as cut along lines 2—2 in FIG. 2. The Braille display 2 is enclosed in a housing 22. FIG. 6 shows four Braille dots 20 a, b, c, d., one-half of a Braille character 14 inside of the module 18. The Braille dots 20 are shown alternately extended and retracted, 20a and 20c extended, 20b and 20d retracted. Each Braille dot 20 is operably attached to a microelectromechanical (herein also know as "MEMS") device 16 a, b, c, d, respectively, this actuation can be either direct, or indirect utilizing pneumatic or hydraulic force. In this embodiment, the Braille dot 20 is attached and operates using pneumatic force. Additionally, the Braille dot 20 does not have to be a distinct, separate element but can also be a portion of the top surface 46 (see FIGS. 7A and 7B). The MEMS device 16 is comprised of a base 26 and frame 24. The base 26 has a base aperture 34, which provides a passage from the plenum 32 to the chamber 30. The frame 24 has a port 36 opening from the chamber 30. Actuator 28 (for illustrations purposes shown as a sliding element or boss in FIG. 5) operates to open and close the MEMS device 16. The Braille dot 20 is made from a flexible, resilient polymer and is secured to the inside of the housing 22 juxtaposed between the port 36 and an opening 38 in the housing 22. When the actuator 28 operates to open the MEMS device 16 air in the plenum 32 flows into and pressurizes the chamber 30. The pressure is exerted on the Braille dot 20 through port 36. The pressure on the Braille dot 20 forces the Braille dot 20 to expand through the opening 38 (20a and 20c). The Braille dot 20 expands until it reaches a point of equilibrium where the resilient nature of the flexible, resilient polymer equals the pressure being applied. At that point, the Braille dot 20 remains expanded with the MEMS device 16 still open. When the actuator 28 operates to close the MEMS device 16, it closes the base aperture 34 and the Braille dot 20 remains expanded until pressure is removed from the chamber 30 and vents therefrom. Venting is accomplished by any opening or passage from the chamber 30 to the atmosphere or even into the housing 22. Because of the resilient nature of the polymer, the Braille dot 20 contracts forcing the air out through the vent and retracts back through the opening 38 (20b and 20d). The opening or closing of the vent can be controlled by the MEMS device 16; for instance, when such MEMS device 16 is a three-way valve. This is shown in FIGS. 7A, 7B, 8A, and 8B. The second valve position in a three-way valve opens the vent 33. This will allow faster refresh rates. Venting also can be accomplished by leak holes (not shown) from the chamber 30, including a leak hole in the flexible, resilient polymer of the Braille dot 20. The Braille dot 20 will expand and remain expanded, as explained above, provided the air flow into the chamber 30 exceeds the air flow out of the chamber 30 through the leak hole. When the air flow into the chamber 30 is reduced to a certain amount or discontinued (as when the MEMS device 16 is closed) the Braille dot 20, because of its resilient nature, will contract, as described above, and forces the air out of the chamber 30 throught the leak hole. The actuator 28 can be operated electrostatically, thermally, piezoelectrically or using shapememory alloys.

Figure 7A:
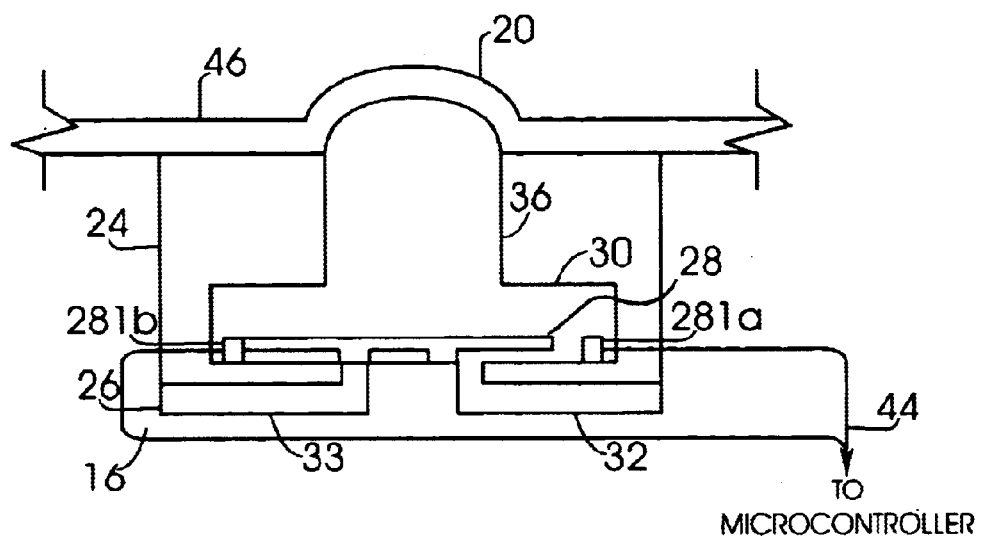
FIGS. 7A, and 7B are detail views of a MEMS device and Braille dot extended and retracted, respectively.
Figure 7B:
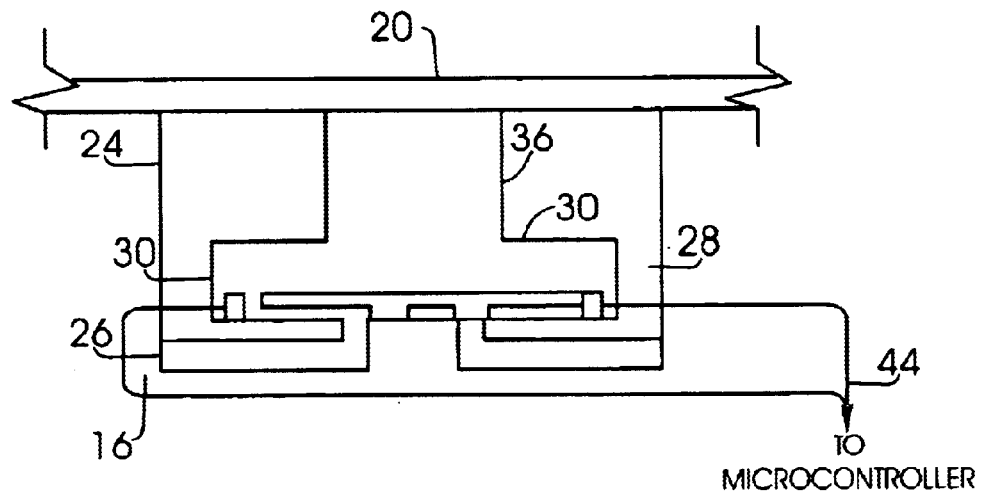

Referring now to FIGS. 7A and 7B there are shown detail views of a Braille dot with a MEMS device 16 extended and retracted, respectively. The actuator 28 is a sliding element operating between two electrodes (electrostatic), 281a and 281b depending on to which electrode voltage is applied. In FIG. 7A voltage is being applied to electrode 281b and the slide element 28 is attracted to it, opening a passage to plenum 32 and closing the passage to the vent path 33. In this position air flows into the chamber 30 and the chamber 30 is allowed to pressurize and expand the Braille dot 20. In this the Braille dot 20 is formed by distorting the top surface 46 attached to the frame 24 (which may be part of the housing 22 module 18 and is not shown in FIG. 7A or 7B). The Braille dot 20, is just a dimple in the top surface 46. Referring now to FIG. 7B, voltage is applied to electrode 281a and the slide element 28 is attracted to it closing the passage to the plenum 32 and opening the passage to the vent path 33 and allowing the pressure to vent out of the chamber 30. Without the pressure, the Braille dot 20 contracts, flattening out the Braille dot in the top surface 46. The voltage to the electrodes 281a, 281b is controlled by either the microcontroller 40 through lines 44 or the module microcontroller 45 through lines 44 allowing independent extension and retraction of the Braille dots 20.

Figure 8A:
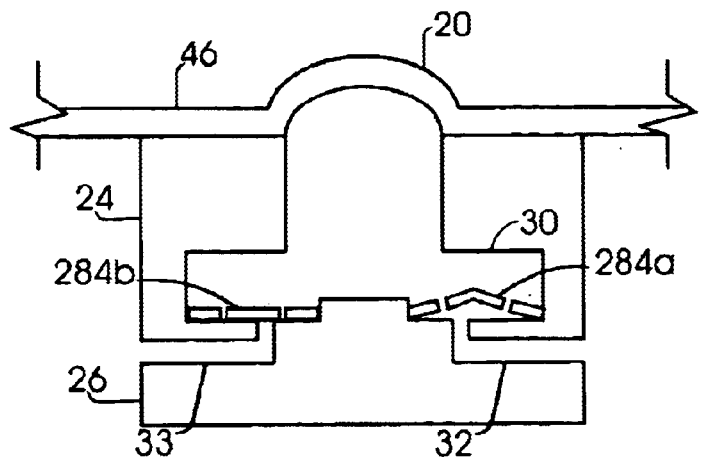
FIGS. 8A, and 8B are details of a MEMS valve device that indirectly actuates a Braille dot.
Figure 8B:
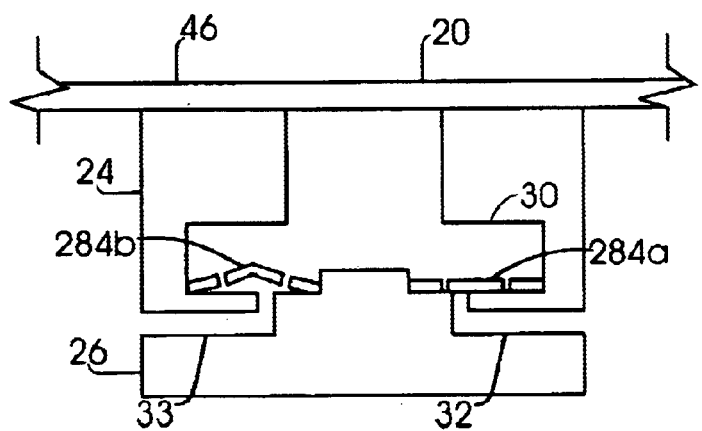

FIG. 8 is a design for a microelectromechanical device that indirectly actuates a Braille dot by opening and closing a valve that allows gas, e.g. air, etc or fluid to exert pressure on a resilient, flexible polymer to form the Braille dot 20. In FIGS. 8A and 8B are shown detail views of a Braille dot 20 with a MEMS device 16 extended and retracted, respectively. The actuators are a pair of MEMS microvalves 284a, 284b which open or close. The MEMS microvalves 284a, 284b can be actuated electrostatically, thermally, piezoelectrically or using thin film shape-memory alloys. In FIG. 8A, the MEMS microvalve 284a is open allowing pressurized gas from the plenum 32 into the chamber 30, while the MEMS microvalve 284b is closed blocking the pressurized gas from leaving the chamber 30. The pressurized gas in the chamber 30 expands the Braille dot 20. In this the Braille dot 20 is formed by distorting the surface covering 45 attached to the frame 24 (which may be part of the housing 22 or module 18 and is not shown in FIG. 8A or 8B). The Braille dot 20, is just a dimple in the top surface 46. Referring now to FIG. 8B, the MEMS microvalve 284a is now closed blocking the flow of pressurized air from the plenum 32 and the MEMS microvalve 284b is now opened allowing the air to evacuate from the chamber 30 to the vent 33. With the pressure vented, the Braille dot 20 contracts, flattening out the dimple on the top surface 46. The voltage to the two the MEMS microvalves 284a, 284b are controlled either directly by the microcontroller 40 or by the module microcontroller 45 to extend and retract Braille dots 20 independent of other Braille dots 20.

Figure 9A:
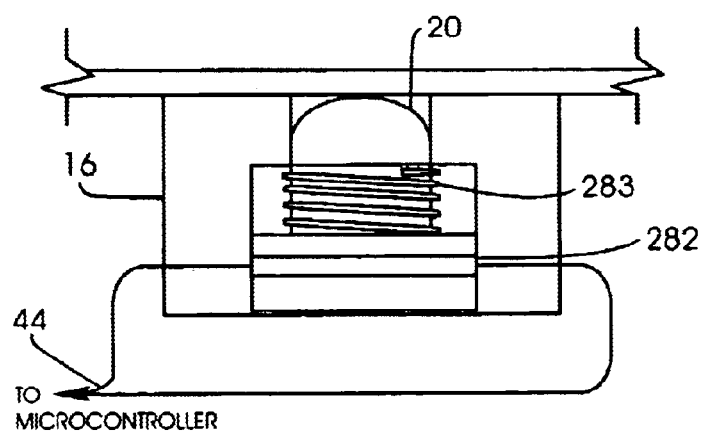
FIGS. 9A, and 9B are details of a MEMS device that directly forms the Braille dot using a thin film shape memory alloy or piezoelectric element.
Figure 9B:
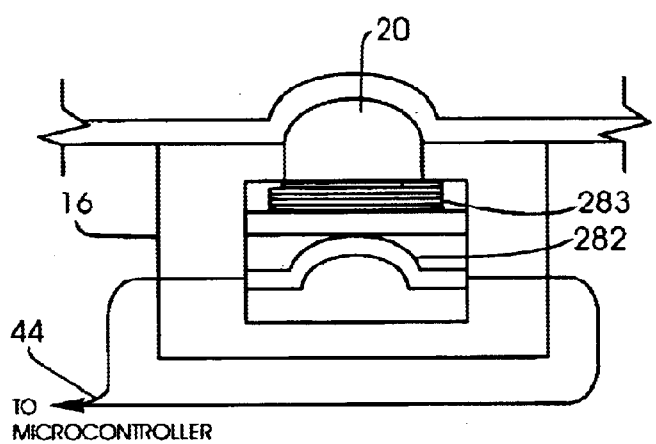

FIGS. 9 and 10 show directly actuated devices using shape memory alloy or piezoelectric based devices. FIG. 9 is a design for a microelectromechanical device that directly actuates a Braille dot using a thin film shape memory alloy or piezoelectric element to form the Braille dot 20. In FIGS. 9A and 9B, there is shown a detailed view of a Braille dot 24) and MEMS device 16 which uses either a thin film shape memory alloy or piezoelectric element 282 as the actuator. A thin film SMA based microelectromechanical actuator is significantly different than traditional bulk shape memory alloy actuators in size, fabrication techniques, and operation. The mechanical properties of a thin film SMA can be precisely tailored by changing the alloy ratios during fabrication while a macro sized bulk SMA actuator may have regions where the alloy ratio changes within the bulk material of the actuator, these regions will increase power consumption, reduce fatigue resistance and limit life. Thin film SMA actuators have greater fatigue life and improved phase transition characteristics then traditional bulk SMA actuators. The thin film SMA also has faster response and lower power consumption than traditional bulk SMA actuators due to their reduced volume and large surface area which allows the actuator to change from one phase state to another faster than the larger bulk SMA actuators. The rapid response of the thin-film SMA actuators allows a user to quickly scroll through a document without having the refreshable Braille display lag behind. The lower power consumption of a thin film SMA actuator reduces the amount of heat that needs to be dissipated from the actuators during operation and can permit battery operation for use with portable electronic devices. Shape Memory Alloys (SMA's) are a unique class of alloys which have the ability to form two different crystalline phases, defined as martensite and austenite, in response to temperature and strain. SMA's are produced by equiatomically combining at least two component metals into a desired shape, which is then annealed. When produced, the SMA is in the austenite phase, having a certain shape and characterized by low ductility, high Young's modulus and high yield stress. Upon cooling the SMA changes to the martensite phase characterized by high ductility, a low Young's modulus and low yield stress. In the martensite phase, the SMA is easily deformed and can take on a different shape from its austenite or original shape by applying an external strain. The SMA will retain this different shape until it is heated to its austenitic transformation temperature. When the SMA is heated to its austenitic transformation temperature the SMA transitions to its austenite phase and transforms back to its original shape. Similarly, piezoelectric elements 282 can be tailored for the application. FIGS. 9A and 9B also show the application of a direct actuation of the Braille dot 20 without the need of a pneumatic or hydraulic force.

If a thin film SMA element 282 is used then in FIG. 9A the thin film SMA element 282 is in its martensite phase with the Braille dot 20 retracted. Since the martensite phase is characterized by high ductility, low Young's modulus and low yield stress, the thin film SMA element 282 is easily deformed by external stresses like biasing means 283, shown as a spring in FIG. 10. When heated to its austenitic transfer temperature, the thin film SMA element 282 transitions from its martensite phase to its austenite phase transforming to its austenitic or original shape. The force produced by the biasing means 283 is less than the force produced by the thin film SMA element 282 during this transformation. The thin film SMA element 282, thereby, overcomes that force during this transformation, and, in so doing, extends the Braille dot 20 as shown in FIG. 9B. The thin film SMA element 282 is heated by joule heating using electric current from an electric power source controlled by the microcontroller 40 (not shown in FIG. 9A or 9B). Because the austenite phase is characterized by low ductility, high Young's modulus and high yield stress, the thin film SMA element 282 remains in its austenitic or original shape and the Braille dot 20 remains extended. When the electric current is removed, the thin film SMA element 282 cools to its martensitic transfer temperature at which point it transitions to the martensite phase and the external stress from the biasing means 283 deforms the thin film SMA element 282, retracting the Braille dot 20. Alternately, the thin film SMA element 282 can be operably connected to the Braille dot 20 to retract it when transitioning from its martensite phase to its austenite phase. The Braille dot 20, then, will be extended by the biasing means 283, when the thin film SMA element 282 transitions from the austenite phase to the martensite phase. The Braille dot 20 is extended and retracted based upon the crystalline phase of the thin film SMA element 282. Instead of a spring as shown, the biasing means 283 can be any mechanism including a second thin film SMA element, a diaphragm or manipulated boss. Again, similarly a piezoelectric element 282 can be used so when a electric field is applied the thin film expands resulting in a similar movement of the element 282.

Figure 10A:
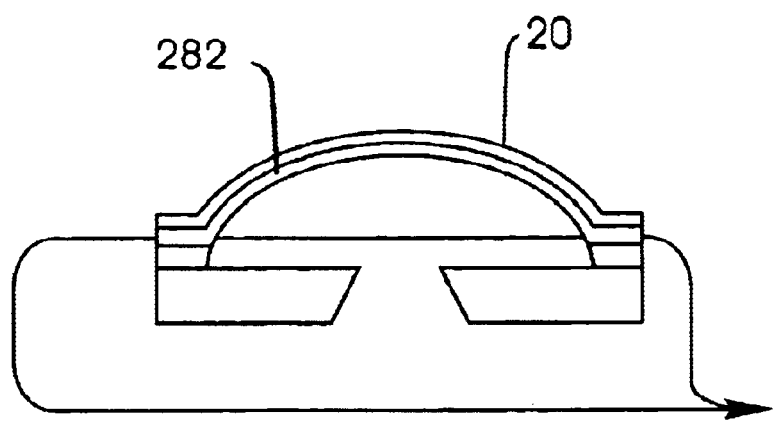
FIGS. 10A, and 10B are details of a MEMS device that directly forms the Braille dot using a thin film shape memory alloy or piezoelectric element.
Figure 10B:
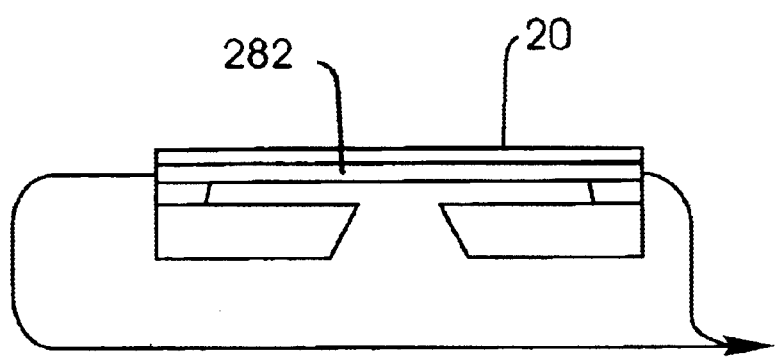

In FIGS. 10A and 10B, the thin film SMA or piezoelectric element is shown directly forming the Braille dot itself 282. The Braille dot may be covered with a polymer cover 20 which can provide a biasing force to flatten the Braille dot. The biasing force may be provided by either a pressure or a vacuum applied through the orifice located directly under the SMA film 282. Similarly direct actuation of the Braille dot 20 can be accomplished with a MEMS device 16 utilizing other mechanisms not based on shape memory alloy like springs, diaphragms and bosses. It is only necessary to have opposite biasing forces operably attached to the Braille dot 20 in a manner such that the Braille dot 20 can be extended and retracted in response to signals from the microcontroller 40 or module microcontrollers 45.

Figure 11A:
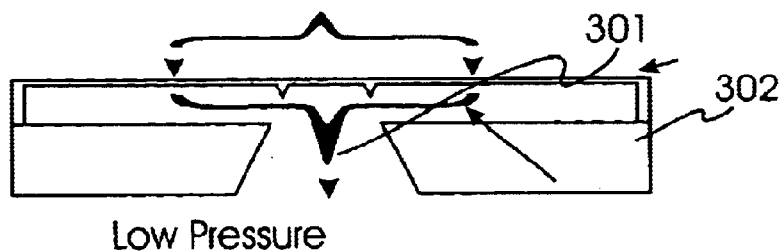
FIGS. 11A, 11B, and 11C are the details of an electrostatic MEMS valve.
Figure 11B:
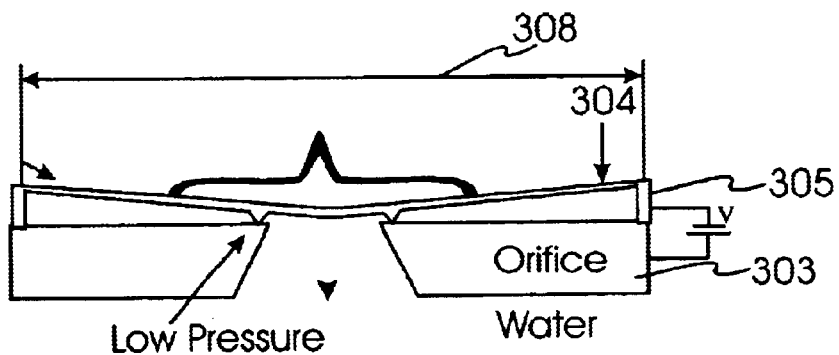
Figure 11C:
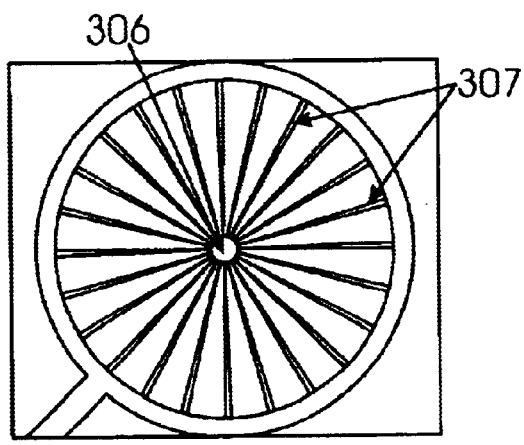
Figure 12:
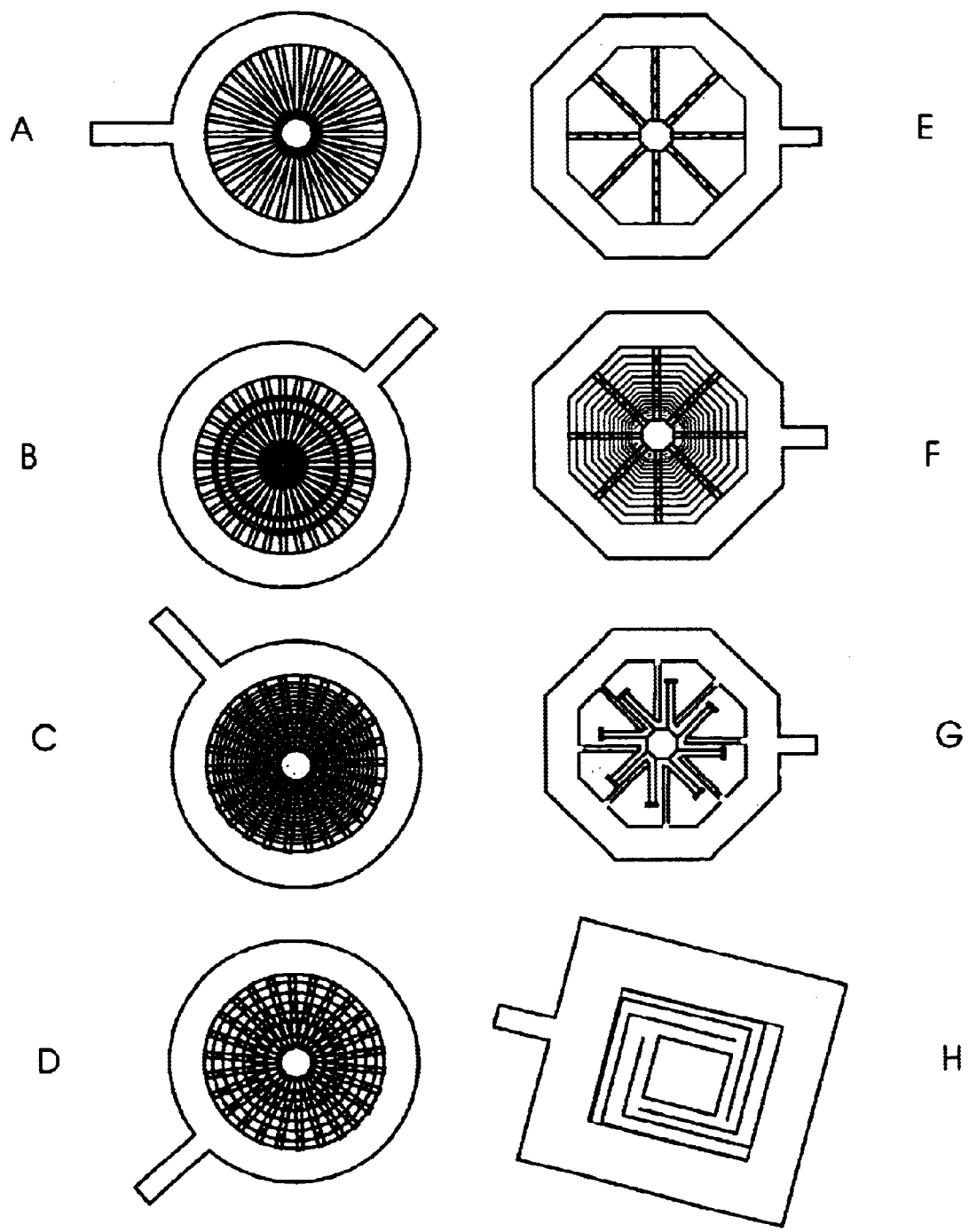
FIGS. 12 A, B, C, D, E, F, G, and H are the details of various electrostatic MEMS valve diaphragm designs.

In another embodiment shown in FIG. 11, the present invention includes an electrostatic microelectromechanical valve having a structure with an open and a closed position comprising an inlet port 301; a base plate 302 containing an electrode 303; and a closure diaphragm 304 containing an electrode 305 wherein the diaphragm 304 with a boss 306 for closing the inlet port 301 and at least two radial beams 307 to connect the boss 306 to the main microelectromechanical valve structure. FIG. 11A shows an open valve, FIG. 11B shows a closed valve and FIG. 11C shows the diaphragm from above. Preferably, the boss of the diaphragm is connected to the main microelectromechanical valve structure by at least four beams 307, and more preferably by at least eight beams 307. In FIGS. 12 A, B, C, D, E, F, G, and H, various electrostatic microelectromechanical valve diaphragm designs are shown. The diaphragm is supported by the valve structure. Preferably, at least 30% of the surface area of the unsupported area 308 of the diaphragm (when the valve is open) is open to allow air flow through, more preferably at least 45% and most preferably 60%.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A refreshable Braille display system or module from such a system comprising
    a) a plurality of microelectromechanical valves having a top surface and a bottom surface, each microelectromechanical valves having an opening or positioned in line with an opening each of which represents a Braille dot and each opening arranged in a pattern of Braille cells with the Braille cells forming a Braille display; and
    b) an elastomeric polymer having a upper and a lower surface, the lower surface of the elastomeric polymer being sealed about each opening which represent the Braille dots;
    wherein during operation of the display system the upper surface of the elastomeric polymer forms a plurality of Braille dots which are extended and retracted based upon the operation of the electromechanical valves.

2. The system or module in claim 1, wherein the elastomeric polymer is a continuous coating or film over the top of the housing for the Braille display.

3. The system or module in claim 2, wherein the elastomeric polymer has a modulus of elasticity less than 500,000 psi.

4. The system or module in claim 3, wherein the continuous coating or film has a thickness from 0.001 to 1.25 mm.

5. The system or module in claim 4, wherein the microelectromechanical valves are electrostatically actuated.

6. The system or module in claim 5, wherein the elastomeric polymer is a thermoplastic polyolefin.

7. A refreshable Braille display system of a module from such a system comprising
    a) a plurality of microelectromechanical piezoelectric based devices having a top surface and a bottom surface, each microelectromechanical piezoelectric based device having an opening or positioned in line with an opening each of which represents a Braille dot and each opening arranged in a pattern of Braille cells with the Braille cells forming a Braille display; and
    b) an elastomeric polymer having a upper and a lower surface, the lower surface of the elastomeric polymer being sealed about the openings which represent the Braille dots;
    wherein during operation of the display system the upper surface of the elastomeric polymer forms a plurality of Braille dots which are extended and retracted based upon the operation of the electromechanical piezoelectric based devices.

8. The system or module in claim 7, wherein the elastomeric polymer is a continuous coating or film over the top of the housing for the Braille display.

9. The system or module in claim 8, wherein the elastomeric polymer has a modulus of elasticity of less than 500.000 psi.

10. The system or module in claim 9, wherein the continuous coating or film has a thickness from 0.001 to 1.25 mm.

11. The system or module in claim 10, wherein the elastomeric polymer is a thermoplastic polyolefin.

12. A refreshable Braille display system or module from such a system comprising
    a) a plurality of microelectromechanical shape memory alloy based devices having a top surface and a bottom surface, each microelectromechanical shape memory alloy based device having an opening or positioned in line with an opening each of which represents a Braille dot and each opening arranged in a pattern of Braille cells with the Braille cells forming a Braille display; and
    b) an elastomeric polymer having a upper and a lower surface, the lower surface of the elastomeric polymer being sealed about the openings which represent the Braille dots;
    wherein during operation of the display system the upper surface of the elastomeric polymer forms a plurality of Braille dots which are extended and retracted based upon the operation of the electromechanical shape memory alloy based devices.

13. The system or module in claim 12, wherein the elastomeric polymer is a continuous coating or film over the top of the housing for the Braille display.

14. The system or module in claim 13, wherein the elastomeric polymer has a modulus of elasticity of less than 500,000 psi.

15. The system or module in claim 14, wherein the continuous coating or film has a thickness from 0.001 to 1.25 mm.

16. The system or module in claim 15, wherein the elastomeric polymer is a thermoplastic polyolefin.

* * * * *